(12) United States Patent
Hirahara

(10) Patent No.: US 10,581,830 B2
(45) Date of Patent: Mar. 3, 2020

(54) MONITORING DEVICE, CONTROL METHOD, AND RECORDING MEDIUM

(71) Applicant: CANON KABUSHIKI KAISHA, Tokyo (JP)

(72) Inventor: Akiko Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 15/854,313

(22) Filed: Dec. 26, 2017

(65) Prior Publication Data

US 2018/0205721 A1 Jul. 19, 2018

(30) Foreign Application Priority Data

Jan. 17, 2017 (JP) .................. 2017-006177

(51) Int. Cl.
*H04L 29/06* (2006.01)
*H04L 9/32* (2006.01)
*G06F 21/60* (2013.01)

(52) U.S. Cl.
CPC ........ *H04L 63/0823* (2013.01); *H04L 9/3242* (2013.01); *H04L 9/3247* (2013.01); *H04L 9/3268* (2013.01); *H04L 63/1408* (2013.01); *G06F 21/608* (2013.01); *H04L 63/0236* (2013.01); *H04L 63/0272* (2013.01); *H04L 63/045* (2013.01); *H04L 63/166* (2013.01)

(58) Field of Classification Search
CPC ............. H04L 63/0236; H04L 63/0823; H04L 63/1408; H04L 9/3242; H04L 9/3247; H04L 63/0272; H04L 63/045; H04L 63/166; H04L 9/3268; G06F 21/608
See application file for complete search history.

(56) References Cited

U.S. PATENT DOCUMENTS 8,522,009 B2 8/2013 Kawana ................. 713/153
2008/0082677 A1* 4/2008 Miyazawa ............ G06Q 20/40
709/229

(Continued)

FOREIGN PATENT DOCUMENTS

JP 2011-135552 7/2011

*Primary Examiner* — Olugbenga O Idowu
(74) *Attorney, Agent, or Firm* — Venable LLP

(57) ABSTRACT

A monitoring device manages information regarding a first reception port and information regarding a second reception port in regard to an IP address of a self-device. The monitoring device issues a route certificate corresponding to a first server certificate and a route certificate corresponding to a second server certificate for realizing communication of relatively lower security strength than the first server certificate, and associates the first server certificate with the first reception port and associates the second server certificate with the second reception port. The monitoring device decides, as data for each reception port, a connection URL and a port number of each reception port, transmits the route certificate corresponding to the first server certificate and data for the first reception port to the network device. When authentication in the network device fails as a result of the transmission of the route certificate corresponding to the first server certificate and the data for the first reception port, transmit the route certificate corresponding to the second server certificate and data for the second reception port to the network device.

8 Claims, 17 Drawing Sheets

(56) References Cited

U.S. PATENT DOCUMENTS

| | | | |
|---|---|---|---|
| 2009/0259759 A1* | 10/2009 | Miyajima | H04L 63/0272 709/229 |
| 2013/0063760 A1* | 3/2013 | Kishimoto | G06F 21/33 358/1.14 |
| 2014/0063531 A1* | 3/2014 | Deter | H04N 1/00244 358/1.14 |

* cited by examiner

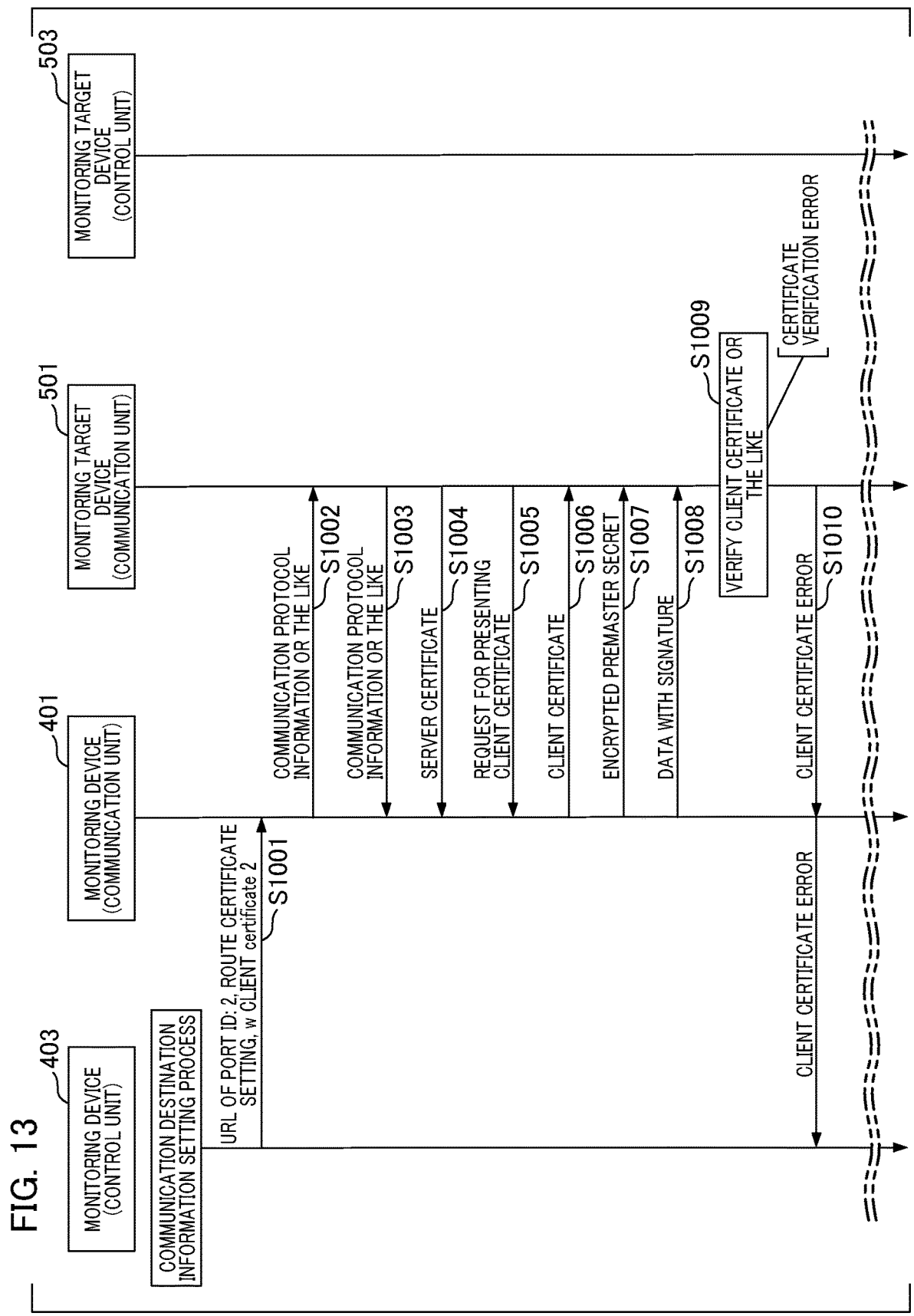

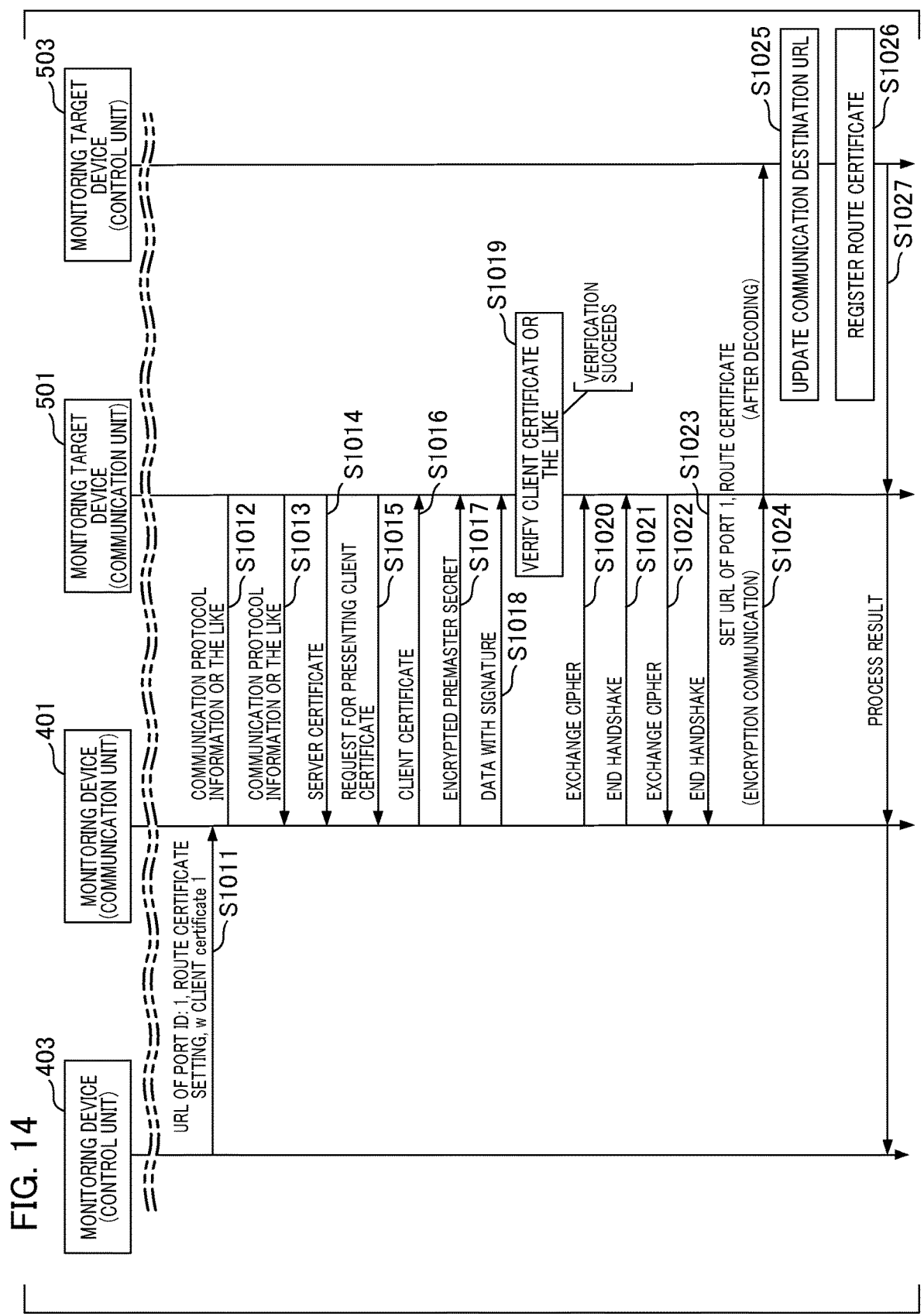

FIG. 15

Initial setting~SSL/TLS setting~

SSL/TLS use port of monitoring device

◎ Designate with host name
- ObserverHost
- Port number of port 1: 444
- Port number of port 2: 443

● Designate with IP address

☑ IPv4
- 180.1.10.110
- Port number of port 1: 444
- Port number of port 2: 443

☐ IPv6
- 1234:5678:9abc::cba9:8765:4321
- Port number of port 1: 444
- Port number of port 2: 443

[ Cancel ]  [ Next ]

FIG. 16

Initial setting~SSL/TLS setting~

SSL/TLS connection setting between monitoring device and device

● To execute SSL/TLS communication according to security strength of device

◎ To execute SSL/TLS connection of device that satisfies following conditions

Security level: Level 3 or higher ▼

◎ To restrict number of reception ports to 1 and prioritize number of connected devices

[ Cancel ]  [ Next ]

FIG. 18

| method : setCommSettings | | |
|---|---|---|
| SerialNumber | ABC01234 | ~1402 |
| webServiceUrl | https://172.10.20.123:443/path | ~1403 |
| ProcessType | 0A101 | ~1404 |
| CertInfo | CADATA01 | ~1405 |

| Data : PortInfo | | |
|---|---|---|
| PortID | 2 | ~1502 |
| PortNo | 443 | ~1503 |
| webServiceUrl | https://172.10.20.123:443/path | ~1504 |
| ServerCert | SCDATA01 | ~1505 |
| RootCACert | CADATA01 | ~1506 |
| ClientCert | CCDATA01 | ~1507 |
| ClientKey | CKEY01 | ~1508 |

| Data : DeviceInfo | | ~1601 |
|---|---|---|
| DeviceID | 0000ABC01234 | ~1602 |
| SerialNumber | ABC01234 | ~1603 |
| Ip4Address | 172.10.30.100 | ~1604 |
| Ip6Address | 1234:5678:9abc::cba9:8765:4321 | ~1605 |
| HostName | 172.10.30.100 | ~1606 |
| DeviceAbility | 01238F8F | ~1607 |
| RegistState | REGISTERED | ~1608 |
| DeviceState | NOERROR | ~1609 |
| PortID | 2 | ~1610 |

MONITORING DEVICE, CONTROL METHOD, AND RECORDING MEDIUM

BACKGROUND OF THE INVENTION

Field of the Invention

The present invention relates to a monitoring device, a control method, and a recording medium.

Description of the Related Art

Device management systems in which monitoring devices installed in networks for customers monitor various histories such as running situations, jobs, and errors of image forming devices such as printers or multi-functional devices have been proposed. In the following description, image forming devices are referred to as monitoring target devices or simply as devices in some cases. Running situations and various kinds of history data of devices are referred to as running information regarding the devices in some cases.

In device management systems, monitoring devices collect information regarding devices in accordance with various methods. As one of the general methods, there is a method of acquiring MIB information regarding device sides from the monitoring devices by SNMP. "MIB" is an abbreviation for "management information base." "SNMP" is an abbreviation for "simple network management protocol." In addition, as one of the web services, there is a method of mounting a web service on a device side or a monitoring device side and acquiring running information on the monitoring device side. As a method of mounting a web service on a monitoring device side, there is a method of installing the same interface as that of a web service mounted on a central management server on the Internet and executing SSL/TLS communication. In the following description, "SSL/TLS" is also simply referred to as "TLS."

When the same interface as that of the central management server is installed in the monitoring device, it is not necessary to change an internal process of a device merely by changing a destination of the device from the central management server to the monitoring device in an intranet. Further, by using TLS communication, it is possible to execute security-guaranteed communication. Japanese Patent Laid-Open No. 2011-135552 discloses a technology in which a communication destination is preset so that a device serving as an SSL client transmits running information to a central management server on the Internet and the communication destination is securely changed to a monitoring device in an intranet.

With an increase in recent high security demands for communication, security levels of devices have increased year by year. In particular, countermeasures against dangers to encryption are important and new protocol versions, encryption algorithms, encryption suites, and the like are mounted on new devices so that more secure communication methods can be executed. Accordingly, in order to utilize security levels of devices as much as possible, it is necessary for a central management server and a monitoring device to change communication methods for each device. Communication protocol versions, encryption suites, and the like can be changed dynamically with handshakes of TLS. However, when server certificates are in danger, it is necessary to change web servers, which is not easy. On monitoring device sides which are web server sides, it is necessary to prepare ports (web ports) equal in number to server certificates covering all of the old and new devices. On device sides which are web clients, it is necessary to set appropriate ports.

However, the device management method disclosed in Japanese Patent Laid-Open No. 2011-135552 is not a technology for selecting appropriate web ports. In the device management method, a URL of the central management server with which a self-device is to communicate is preset at the time of initial shipment on the device side, and thus manual setting is necessary in order to change the URL. That is, it is necessary for a service technician to know a security ability of a target device and give an instruction of an appropriate URL.

SUMMARY OF THE INVENTION

The present invention provides a monitoring device that notifies a network device of a connection destination URL corresponding to an appropriate port according to security strength.

According to an aspect of the present invention, there is provided a monitoring device that monitors a network device, the monitoring device comprising, a memory storing instructions; at least one processor which is capable of executing the instructions causing the monitoring device to: manage information regarding a first reception port and information regarding a second reception port in regard to an IP address of a self-device; issue a route certificate corresponding to a first server certificate and a route certificate corresponding to a second server certificate for realizing communication of relatively lower security strength than the first server certificate; associate the first server certificate with the first reception port; associate the second server certificate with the second reception port; decide and retain, as data for each reception port, a connection URL and a port number of each reception port; transmit the route certificate corresponding to the first server certificate and data for the first reception port to the network device, and when authentication in the network device fails as a result of the transmission of the route certificate corresponding to the first server certificate and the data for the first reception port, transmit the route certificate corresponding to the second server certificate and data for the second reception port to the network device.

Further features of the present invention will become apparent from the following description of exemplary embodiments with reference to the attached drawings.

BRIEF DESCRIPTION OF THE DRAWINGS

FIG. 13 is a diagram illustrating a sequence for describing an example of the communication destination information setting process.

FIG. 14 is a diagram illustrating an explanatory sequence of a communication destination information setting process.

FIG. 15 is a diagram illustrating an example of an initial setting screen.

FIG. 16 is a diagram illustrating an initial setting screen according to Example 2.

FIG. 18 is a diagram illustrating communication data of a request for setting a route certificate and communication destination information.

FIG. 19 is a diagram illustrating an example of port information.

FIG. 20 is a diagram illustrating an example of device information.

DESCRIPTION OF THE EMBODIMENTS

Embodiment 1

Figure 1:
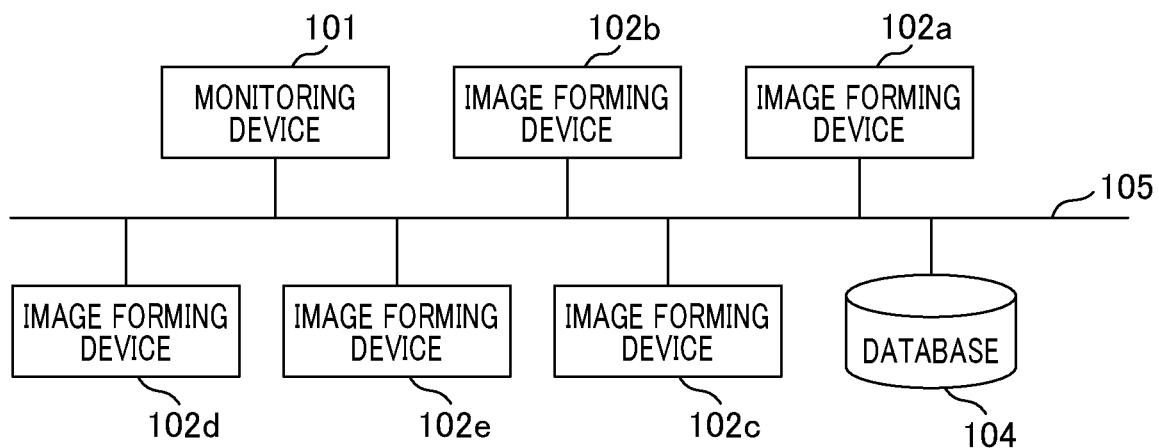
FIG. 1 is a diagram illustrating a system configuration according to an embodiment.

FIG. 1 is a diagram illustrating a system configuration according to an embodiment.

An information processing system illustrated in FIG. 1 includes a monitoring device 101, a plurality of image forming devices 102a to 102e, and a database 104. The monitoring device 101 monitors and manages the plurality of network devices (the image forming devices). The monitoring device 101 may transmit or may not transmit monitoring data collected from the image forming devices to a central management device on the Internet. The present invention can be applied to, for example, general device management in an intranet.

The monitoring device 101 is connected to the plurality of image forming devices 102a to 102e which are monitoring target devices that can communicate via a LAN 105. "LAN" is an abbreviation for "local area network." Hereinafter, the image forming devices 102a, 102b, 102c, 102d, and 102e are referred to as monitoring target devices 102x or devices 102x in some cases.

The monitoring device 101 is connected to a database 104 via the LAN 105 so that device information including monitoring target information acquired from the monitoring target devices 102x is retained in the database 104. The database 104 is a history storage unit in which the monitoring device 101 accumulates information for monitoring, ability information acquired from the monitoring target devices, various collected counters, various kinds of history information, and the like. When the monitoring device 101 has a function of the database 104, there is no configuration of the database 104.

Figure 2:
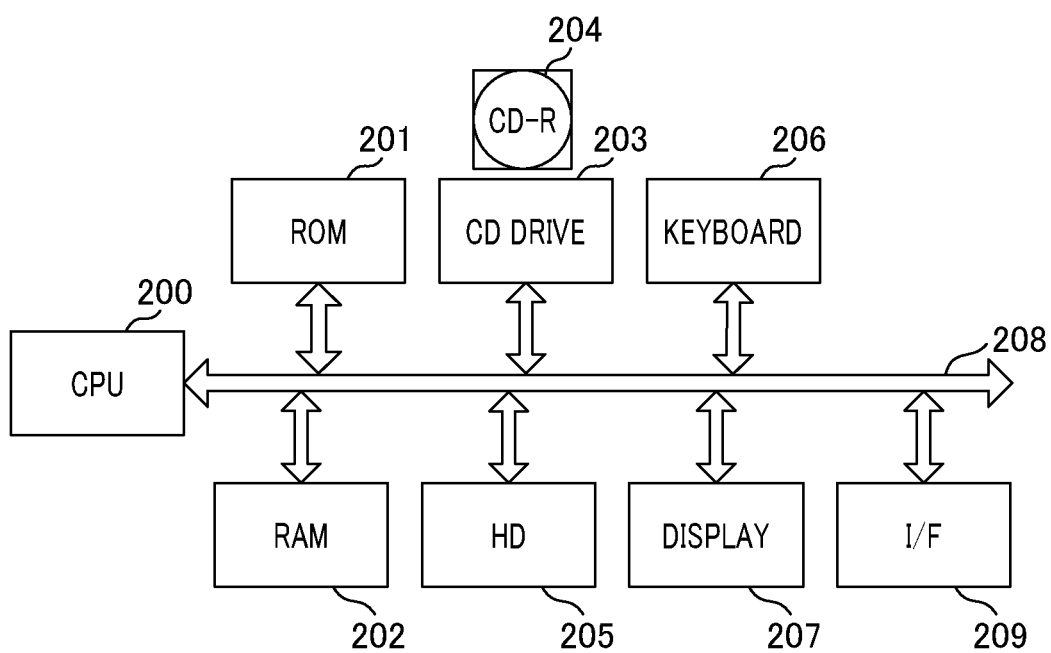
FIG. 2 is a diagram illustrating a hardware configuration example of a monitoring device.

FIG. 2 is a diagram illustrating a hardware configuration example of a computer system realizing a monitoring device.

The hardware configuration illustrated in FIG. 2 can be applied to the configuration of a central management device (not illustrated). The monitoring device 101 includes a CPU 200 to an I/F 209. The CPU 200 controls the entire monitoring device. "CPU" is an abbreviation for "central processing unit." The CPU 200 executes an application program stored in a hard disk (HD) 205, various driver programs, an OS, and a device management program according to the embodiment. At this time, the CPU 200 executes control to temporarily store information, a file, or the like necessary to execute a program in a RAM 202. "OS" is an abbreviation for "operating system." "RAM" is an abbreviation for "random access memory." A process of each step of each flowchart to be described below is realized when the CPU 200 executes a process based on a program code stored in a storage unit such as a ROM 201, the RAM 202, and the HD 205. "ROM" is an abbreviation for "read-only memory." The ROM stores a program such as a basic I/O program, a program governing each process on the computer system and various kinds of data.

The RAM 202 is a temporary storage unit and functions as a main memory or a work area of the CPU 200. A compact disc (CD) drive 203 executes a read process from a storage medium. The CD drive 203 can load a program or the like stored on a CD-R 204 serving as a storage medium to the computer system. The storage medium is not limited to the CD-R. Any storage medium such as a floppy disk (FD), a CD-ROM, a CD-RW, a PC card, a DVD, an IC memory card, an MO, or a memory stick can be used.

The CD-R 204 is a storage medium that stores a computer-readable program. The HD 205 is one external storage unit, functions as a mass memory, and stores an application program, various driver programs, an OS, a network printer control program, a relevant program, and the like.

A keyboard 206 is an instruction input unit that is used by a user or an administrator to input a control instruction, setting, or the like to the monitoring device 101. A display 207 displays a control instruction input from the keyboard 206 or states of the monitoring target devices 102x. A drawing command issued through the structure of the OS by an application is interpreted by a graphic card and information converted into an analog signal or a digital signal is displayed on a predetermined display unit in some cases. The display control according to the embodiment is assumed to include a process of issuing a drawing command through the OS so that the drawing command can be displayed on the display unit. A system bus 208 mediates exchange of data in the computer system illustrated in FIG. 2. The I/F 209 is an interface that exchanges data with an external device.

Figure 3:
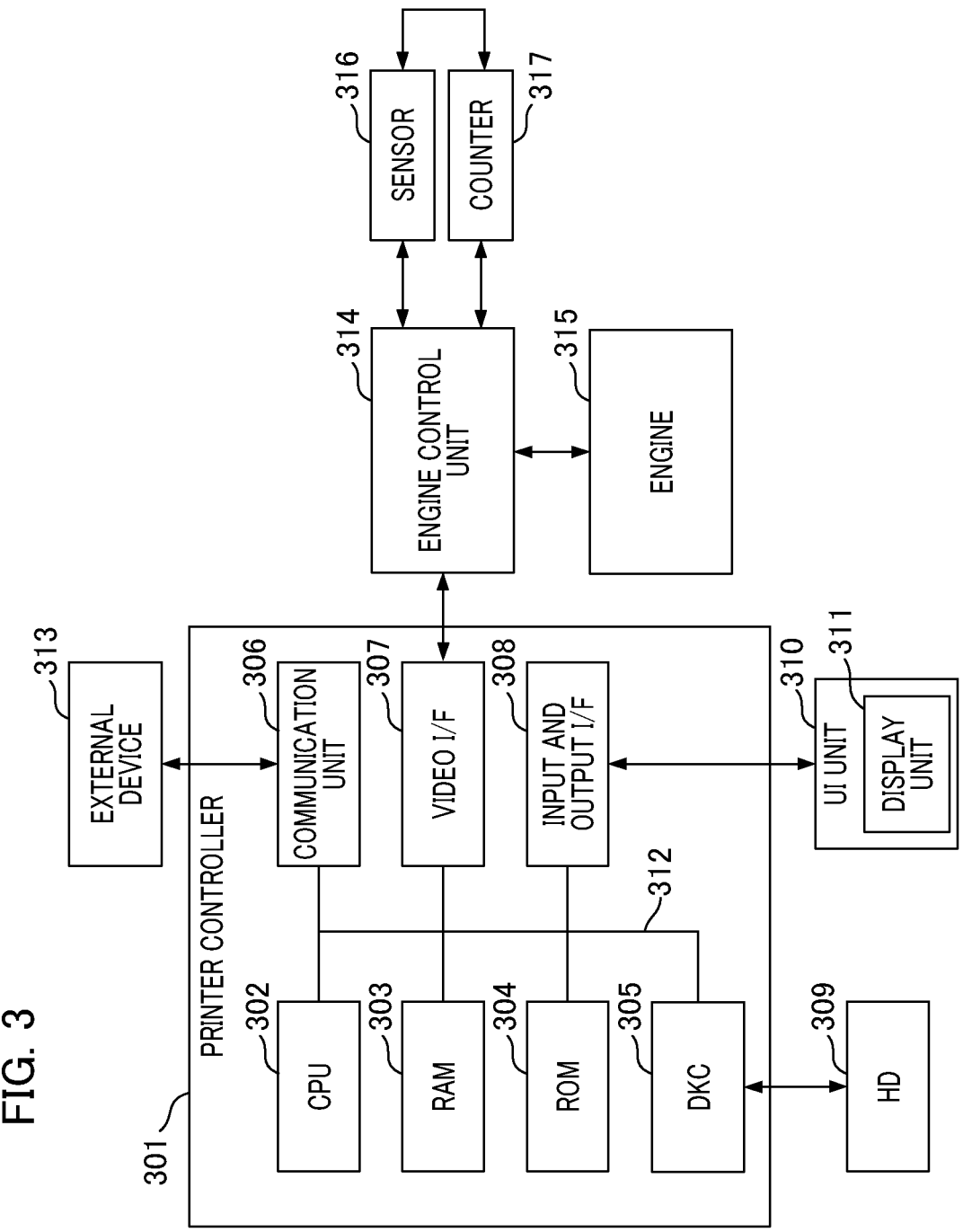
FIG. 3 is an exemplary functional block diagram illustrating a printer control unit and peripheral portions of the printer control unit.

FIG. 3 is an exemplary functional block diagram illustrating a printer control unit and peripheral portions of the printer control unit of the monitoring target device.

The monitoring target device 102x includes a printer controller 301, an HD 309, a UI unit 310, an engine control unit 314, an engine 315, a sensor 316, and a counter 317. The printer controller 301 includes a communication unit 306 that executes a predetermined protocol to transmit and receive various kinds of data to and from an external device 313 (equivalent to the monitoring device 101 in FIG. 1) such as a host computer. The printer controller 301 executes communication, reception of image data, and development of the received image data into information which can be printed by a printer and includes a video I/F 307 that executes exchange of a signal with the engine control unit 314 and serial communication.

A CPU 302 of the monitoring target device 102x generally controls access to various devices connected to a system bus 312 based on a control program or the like stored in the ROM 304 or the HD 309. Further, the CPU 302 outputs an image signal as output information to the printer engine connected via the video I/F 307.

The RAM 303 functions as a main memory or a work area of the CPU 302. A disc controller (DKC) 305 controls access to the external memory 309 such as a hard disk (HD) that stores a boot program, various applications, font data, a user file, an edit file, and the like. The UI unit 310 includes a display unit (display panel) 311 or a keyboard and mediates supply of information to an operator or an input instruction from the operator via an input and output I/F 308.

The engine control unit 314 exchanges a signal with the printer controller and controls each unit such as the printer engine, the sensor, the counter, and the like through serial communication. The engine control unit may be configured to include a CPU. The engine 315 is an engine of the monitoring target device 102x which is an image forming device. The sensor 316 detects an error such as breakdown or jamming. The engine control unit 314 notifies the control program on the CPU 302 of a detection result of the sensor 316 so that the control program can generate error information. The counter 317 is a counter that is updated when a printer job is completed. In response to a request from the UI unit 310 or the external device 313, counter information is acquired as charging information from the control program on the CPU 302 via the engine control unit 314.

Figure 4:
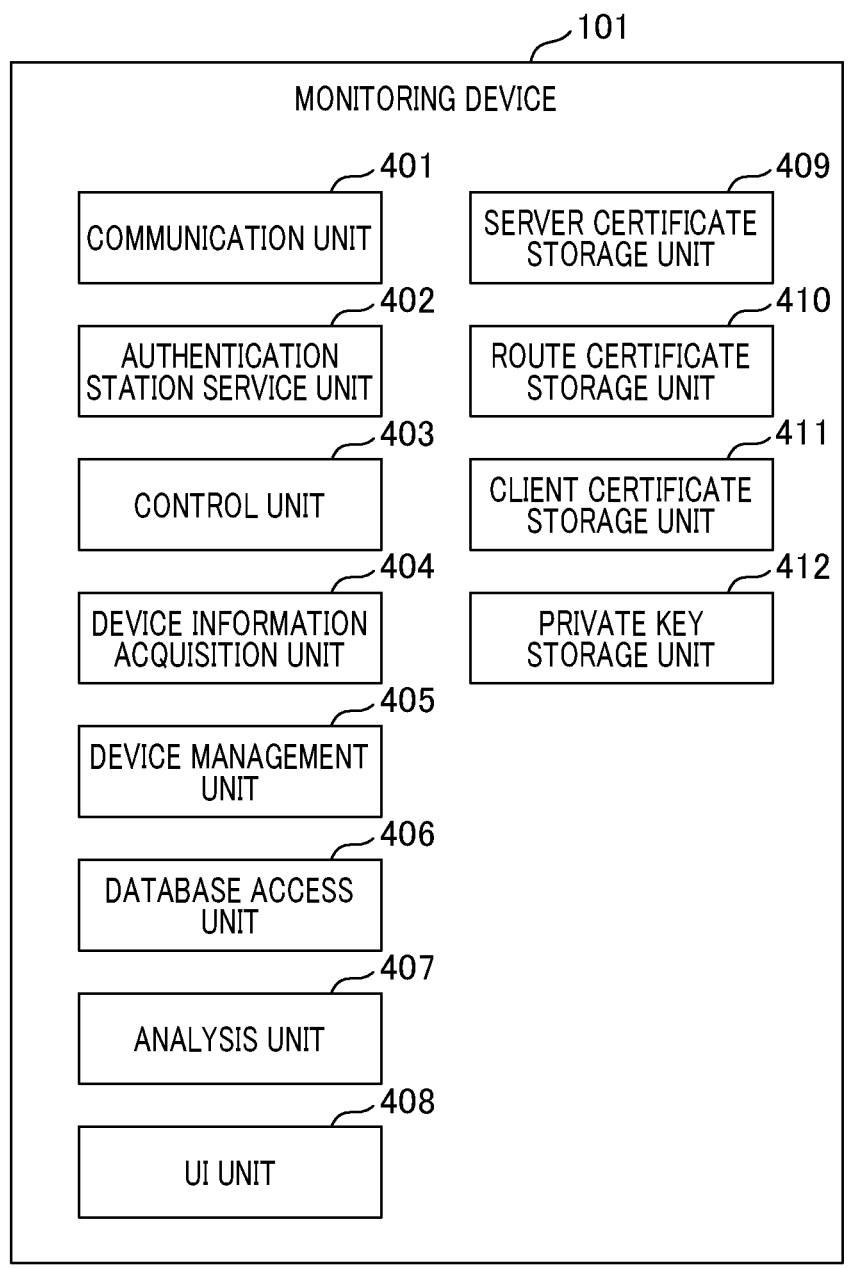
FIG. 4 is an exemplary functional block diagram illustrating the monitoring device.

FIG. 4 is an exemplary functional block diagram illustrating the monitoring device.

The monitoring device 101 includes a communication unit 401 to a private key storage unit 412. The communication unit 401 executes control of transmission and reception of data to and from an external information processing device such as the monitoring target device 102x via the I/F 209 and the LAN 105. The communication unit 401 executes a process according to a communication protocol. In SSL/TSL communication according to the embodiment, authentication and encryption communication is executed using relevant certificates and a public key/private key.

An authentication station service unit 402 issues a server certificate used to communicate with the monitoring target device 102x and a route certificate by which the sever certificate can be verified. The monitoring device 101 is installed in a customer environment and subsequently an address (an IP address or a host name) on a network is decided. Accordingly, the monitoring device 101 includes the authentication station service unit 402. After the address of the monitoring device 101 is specified, a control unit 403 instructs the authentication station service unit 402 to issue the server certificate. The issued server certificate is stored in a server certificate storage unit 409 and is set in a port with which the monitoring target device 102x communicates via the communication unit 401. The control unit 403 instructs the authentication station service unit 402 to issue the route certificate for verifying the server certificate and stores the route certificate in a route certificate storage unit 410 to be described below. In the embodiment, the authentication station service unit 402 issues a route certificate corresponding to a first server certificate and a route certificate corresponding to a second server certificate for realizing communication of relatively lower security strength than the first server certificate.

The control unit 403 executes control/instruction on the monitoring target device 102x based on information acquired from a device information acquisition unit 404. The control unit 403 generates transmission data according to a communication protocol in response to a request from each processing unit when generating control/instruction data to be transmitted to the monitoring target device 102x. The generated transmission data is transmitted to the monitoring target device 102x via the communication unit 401.

The device information acquisition unit 404 acquires various kinds of information regarding a device, such as ability information and monitoring data of the monitoring target device 102x, from the device. Further, the device information acquisition unit 404 acquires counter information and running information such as a history retained inside the monitoring target device. The device information acquisition unit 404 also acquires firmware information of the monitoring target device 102x. A device management unit 405 manages various kinds of device information and port information of the monitoring target device 102x acquired from the monitoring target device 102x by the device information acquisition unit 404. Information regarding a management target is retained in an internal storage device, such as the database 104 or the RAM 202, via a database access unit 406. The device information acquisition unit 404 detects updating of the firmware information of the firmware update monitoring target device as follows. The device information acquisition unit 404 detects updating of the firmware information by comparing firmware information acquired and managed by the device management unit 405 to newly acquired firmware information.

The database access unit 406 governs input and output to and from the database 104 using the I/F 209. When necessary data such as monitoring data and setting data is retained in the internal storage device, the database access unit 406 governs input and output to and from the storage device. An analysis unit 407 analyzes reception data received from the monitoring target device 102x and delivers the reception data to a processing unit appropriate for each piece of data via the communication unit 401. In the SSL/TLS communication, the communication unit 401 decodes the reception data and the analysis unit 407 analyzes the decoded data.

A UI unit 408 displays information regarding the monitoring device 101 and the monitoring target device 102x on a manipulation screen and the like using the display 207. The UI unit 408 is configured to set to able to set a value of a display item using the keyboard 206 and functions as a user interface of the device management program.

The server certificate storage unit 409 retains the server certificate issued by the authentication station service unit 402. The route certificate storage unit 410 retains the route certificate issued by the authentication station service unit 402. A client certificate storage unit 411 retains a client certificate used for client authentication of a TLS handshake protocol used to set communication designation information for the monitoring target device 102x. In the embodiment, there are at least as many client certificates as there are server certificates set in advance in an application program. A route certificate by which it can be determined whether the client certificate is legitimate is preinstalled in the monitoring target device 102x. By using the route certificate, it is possible to determine that the monitoring device 101 is a client device that the monitoring target device 102x can trust.

The private key storage unit 412 retains a client private key for the client certificate retained in the client certificate storage unit 411. In the embodiment, the client private key corresponding to the client certificate is set in advance in an application program. The client private key is used for the communication unit 401 to generate a digital signature corresponding to the client certificate.

Figure 5:
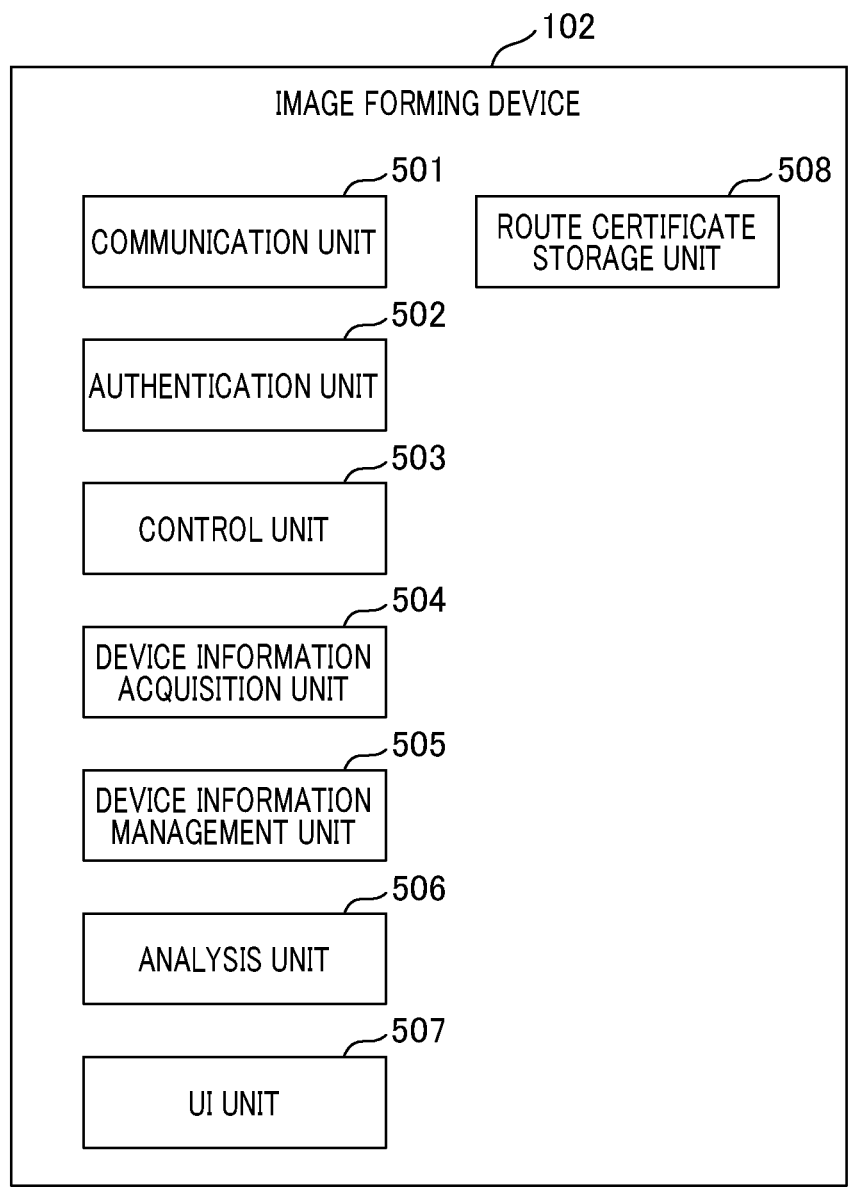
FIG. 5 is an exemplary functional block diagram illustrating a monitoring target device.

FIG. 5 is an exemplary functional block diagram illustrating a monitoring target device.

An image forming device will be described as an example of the monitoring target device 102x with reference to FIG. 5. The image forming device 102x includes a communication unit 501 to a route certificate storage unit 508.

The communication unit 501 controls transmission and reception of data to and from an external device such as the monitoring device 101 via a network such as the LAN 105 and the Internet. The communication unit 501 executes a process according to a communication protocol. In the SSL/TLS communication, the communication unit 501 executes authentication and encryption communication using relevant certificates and a public key/private key.

An authentication unit 502 manages various kinds of authentication information in the image forming device 102x. In the embodiment, various kinds of information according to management functions such as error information and a running status are acquired/set from the monitoring device 101. To realize secure communication, an authentication account is set with appropriate authority in the device and only a request with appropriate authentication information from each external device is processed normally.

A control unit 503 controls various processes according to an instruction, a reception job, and the like via a local/remote UI and an external device. Device information such as monitoring data or running information collected in the device in response to a request from the monitoring device 101 by the control unit 503 is managed by a device information management unit 505 and is processed into transmission data to be transmitted to the monitoring device 101 via the communication unit 501 in response to a request.

A device information acquisition unit 504 acquires error/warning information or running information such as a service call, state information regarding a jam or the like, a history, and a counter generated in the monitoring target device. The device information acquisition unit 504 acquires the ability information or the like of the monitoring target device 102x in response to an instruction from the monitoring device 101. The acquired data is processed into the transmission data by the control unit 503 to be transmitted to the monitoring device 11 via the communication unit 501. In the SSL/TLS communication, the transmission data is encrypted by the communication unit 501 to be transmitted to the monitoring device 101.

The device information management unit 505 manages and controls device information collected by the device information acquisition unit 504. An analysis unit 506 analyzes reception data received from the monitoring device 101 and delivers the reception data to a processing unit appropriate for each piece of data via the communication unit 501. In the SSL/TLS communication, the communication unit 501 decodes the reception data and the analysis unit 506 analyzes the decoded data.

A UI unit 507 is equivalent to the UI unit 310 in FIG. 3. The UI unit 507 displays various kinds of information using the display unit 311 of the monitoring target device 102x so that values of display items can be set. The route certificate storage unit 508 stores the route certificate transmitted from the monitoring device 101. The route certificate storage unit 508 stores the route certificate for verifying the client certificate transmitted from the monitoring device 101 in advance according to a TLS handshake protocol.

Figure 6:
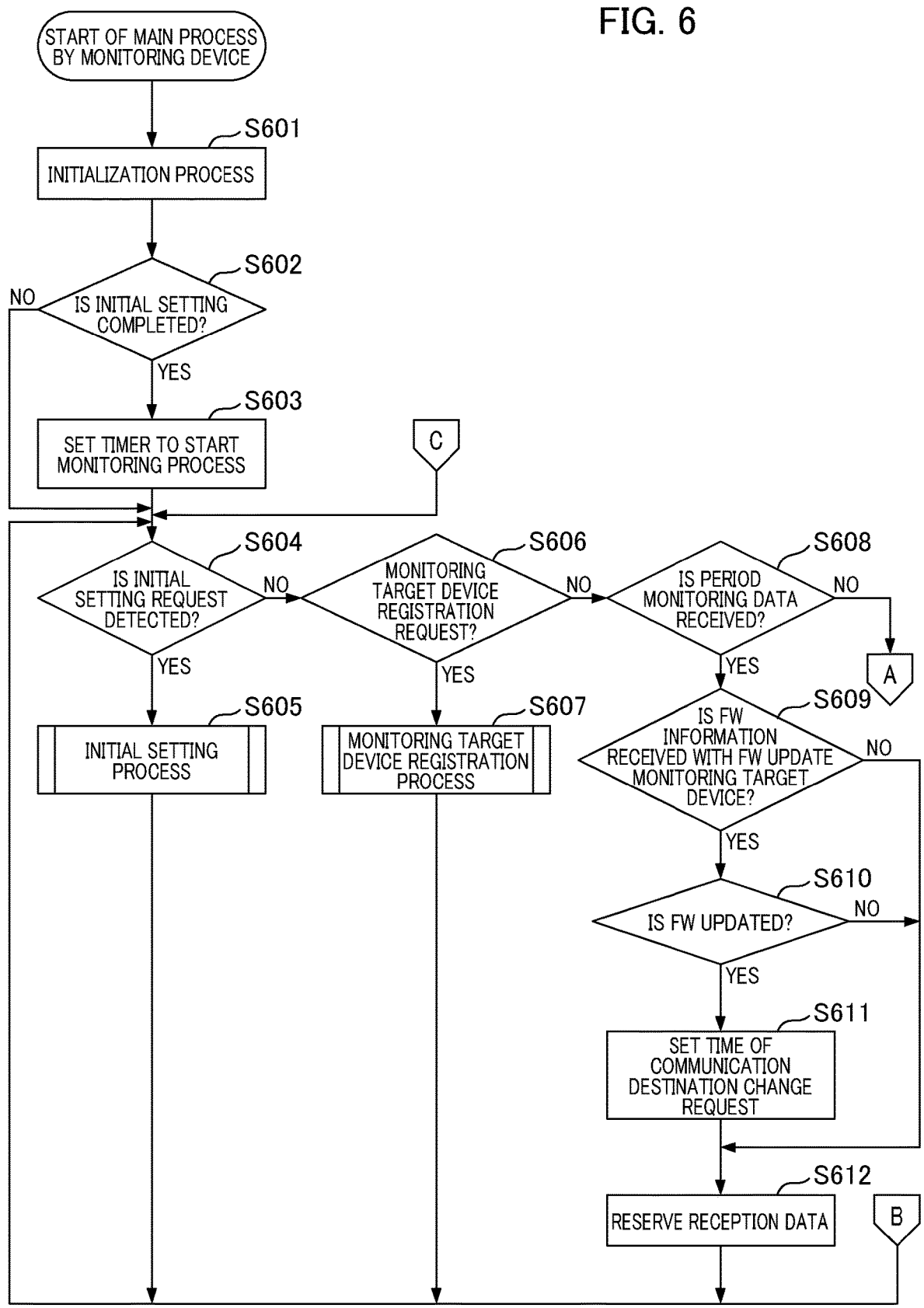
FIG. 6 is an explanatory flowchart illustrating an example of a main process executed by the monitoring device.
Figure 7:
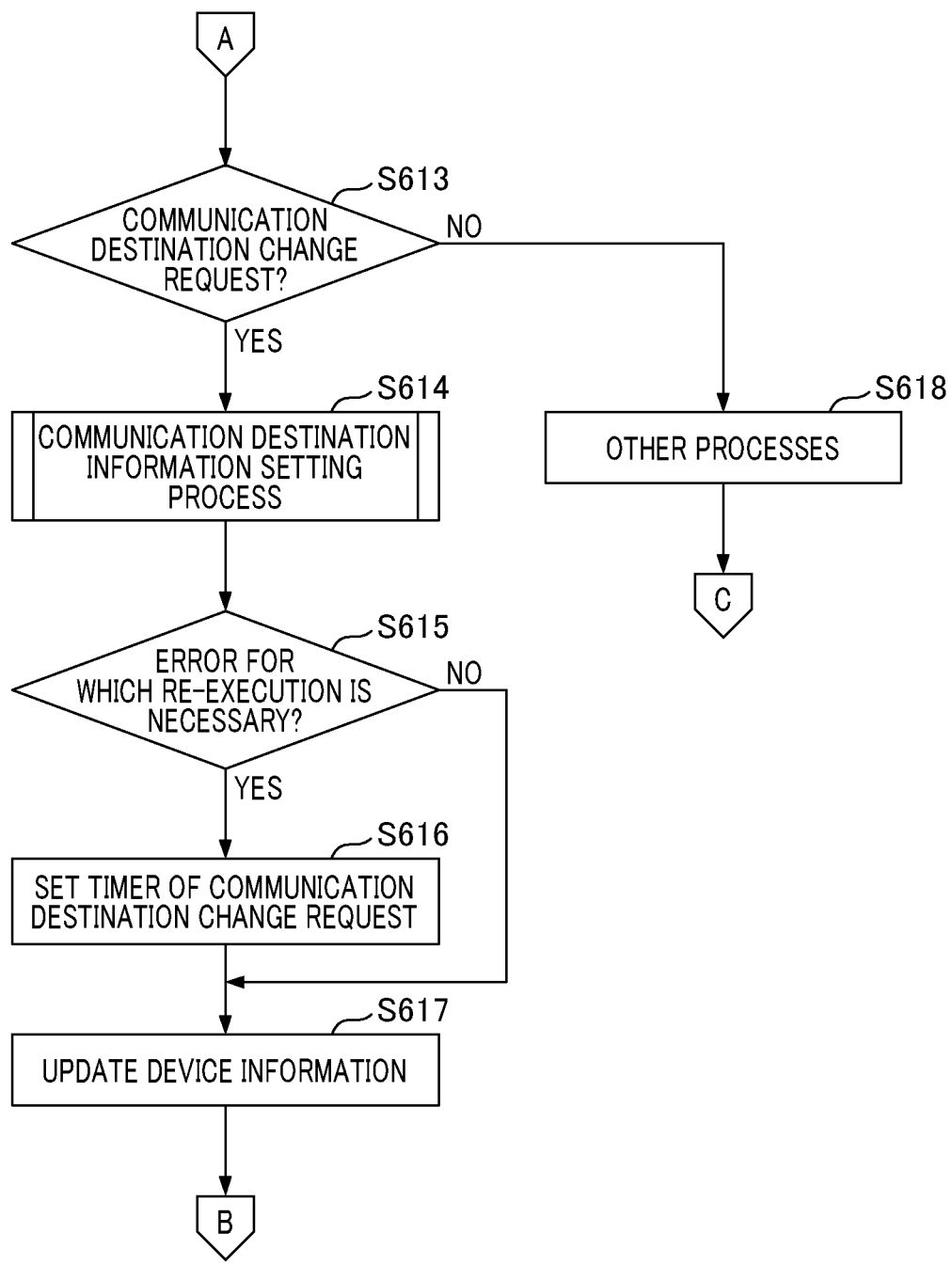
FIG. 7 is an explanatory flowchart illustrating an example of the main process executed by the monitoring device.

FIGS. 6 and 7 are explanatory flowcharts illustrating an example of a main process executed by the monitoring device.

A process of each step of the flowchart from FIGS. 6 to 12 is realized when the CPU in the monitoring device 101 reads and executes the control program stored in the storage unit such as the RAM or the hard disk. Only processes related to the present invention will be described. Since the other processes are different from the nature of the present invention, the description thereof will be omitted. The processes to be described below are assumed to be operated by the control unit 403 serving as a main entity unless otherwise mentioned.

In S601 of FIG. 6, the control unit 403 executes initialization of the system associated with start of the program. Specifically, the control unit 403 reads initialization data necessary to initialize the system and executes a system initialization process on each processing unit based on the initialization data. The control unit 403 reads the initialization data from the database 104, a setting file, or the like. The device management unit 405 executes a process of reading an information table in the monitoring device 101 related to all the monitoring target devices 102x as a monitoring target device list to the RAM 202 via the database access unit 406.

Next, in S602, the control unit 403 determines whether an initial setting process (FIGS. 8 and 9) to be described below is completed. When the initial setting process is completed, the process proceeds to S603. When the initial setting process is not completed, the process proceeds to S604. In S603, the control unit 403 starts a monitoring process. Specifically, the control unit 403 executes the initialization process for device monitoring on all the devices of the monitoring target device list to start the monitoring. The control unit 403 also sets a timer to drive a periodic process. The monitoring target devices 102x are numbered with device IDs based on information such as serial numbers of devices for uniquely specifying the devices. By managing the device IDs as device information, it is possible to confirm whether there is a monitoring target using the device ID in the monitoring target device list.

Next, in S604, the control unit 403 determines whether an initial setting request is detected by the UI unit 408. The initial setting request is made by selecting a menu or the like displayed on a UI of the device management program and is processed by the UI unit 408. When the initial setting request is detected, the process proceeds to S605. When the initial setting request is not detected, the process proceeds to S606.

In S605, the control unit 403 instructs the UI unit 408 to execute the initial settingprocess. The initial setting process will be described below with reference to FIGS. 8 and 9. After the execution of the initial setting process is completed in S605, the process returns to S604. In the embodiment, the initial setting process is executed by the menu of the device management program, but it may be executed when the device management program is installed in a PC environment.

Next, in S606, the control unit 403 determines whether a monitoring target device registration request is detected by the UI unit 408. The monitoring target device registration request is issued by setting a menu displayed on a UI of the device management program and is processed by the UI unit 408. When the monitoring target device registration request is detected, the process proceeds to S607. When the monitoring target device registration request is not detected, the process proceeds to S608.

In S607, the control unit 403 executes a monitoring target device registration process. The monitoring target device registration process will be described below with reference to FIG. 10. After the monitoring target device registration process is completed, the process returns to S604. In S608, the control unit 403 determines whether it is detected that periodic monitoring data is received. The periodic monitoring data is received in response to a request for acquiring target data to the monitoring target device 102x driven by the timer set in S603 or by spontaneous transmission from the monitoring target device 102x. When the control unit 403 detects that the periodic monitoring data is received, the process proceeds to S609. When the control unit 403 does not detect that the periodic monitoring data is received, the process proceeds to S613 of FIG. 7.

In S609 of FIG. 6, the control unit 403 determines whether the firmware information corresponding to a firmware update monitoring target device is received. The control unit 403 determines whether the device is the firmware update monitoring target device according to whether the device ID of the monitoring target device 102x of a period monitoring data acquisition source is registered in a firmware update monitoring target device list. The firmware update monitoring target device list is a list in which the number of initial states is 0 and the device ID of the firmware update monitoring target device is registered and is updated during a communication destination information setting process of FIGS. 11 and 12.

When the target firmware information is received in S609, the process proceeds to S610. When the firmware information is not received, the process proceeds to S612. In S610, the control unit 403 determines whether the firmware is updated. Specifically, the control unit 403 requests the device management unit 405 to determine whether the firmware is updated. The device management unit 405 determines whether the firmware is updated by comparing the registered firmware information to the newly acquired firmware information. When it is determined in S610 that the firmware is updated, the process proceeds to S611. When it is determined that the firmware is not updated, the process proceeds to S612. In S611, the firmware is updated and there is a possibility of the security strength of the device being changed. Thus, to reattempt the communication designation setting again, a timer of a communication destination change request is set. By setting the timer, a communication destination change request of S613 to be described below is detected. After S611, the process proceeds to S612. In S612, the control unit 403 retains the periodic monitoring data received in S608. Specifically, the control unit 403 requests the device management unit 405 to retain the reception data. After S612, the process proceeds to S604.

In S613 of FIG. 7, the control unit 403 determines whether the communication destination change request is detected. The communication designation change request is detected by setting the communication destination change request timer in S611 of FIG. 6 described above. When the communication destination change request is detected, the process proceeds to S614. When the communication destination change request is not detected, the process proceeds to S618. In S618, the control unit 403 appropriately executes the other processes. Then, the process returns to S604 of FIG. 6. Since the other processes are not related to the nature of the present invention, the description thereof will be omitted.

In S614, the control unit 403 executes the communication destination information setting process. The communication destination information setting process will be described with reference to FIGS. 11 and 12. After the communication destination information setting process is completed, the process proceeds to S615. In S615, the control unit 403 determines whether a result of the communication destination information setting process is an error for which it is necessary to reattempt the communication destination information setting process. Specifically, when a recoverable error other than a communication error or a client authentication error is returned, the control unit 403 determines that the error is an error for which it is necessary to reattempt the communication destination information setting process. When the error is the error for which the reattempt is necessary, the process proceeds to S616. When the error is an error for which the reattempt is not necessary, the process proceeds to S617. In S616, the control unit 403 sets the timer of the communication destination change request to execute the communication destination information setting process again. Then, the process proceeds to S617. In S617, the control unit 403 updates the device information. Specifically, the control unit 403 updates the device state or the like in the device information through the communication destination information setting process. Then, the process returns to S604 of FIG. 6.

Figure 8:
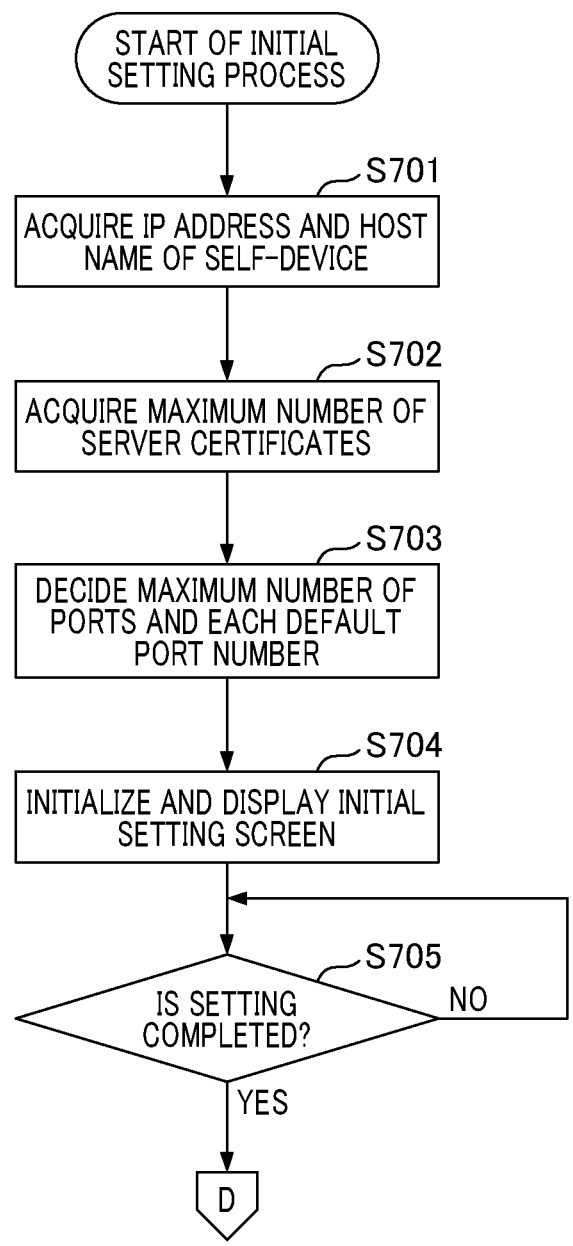
FIG. 8 is an explanatory flowchart illustrating an initial setting process.
Figure 9:
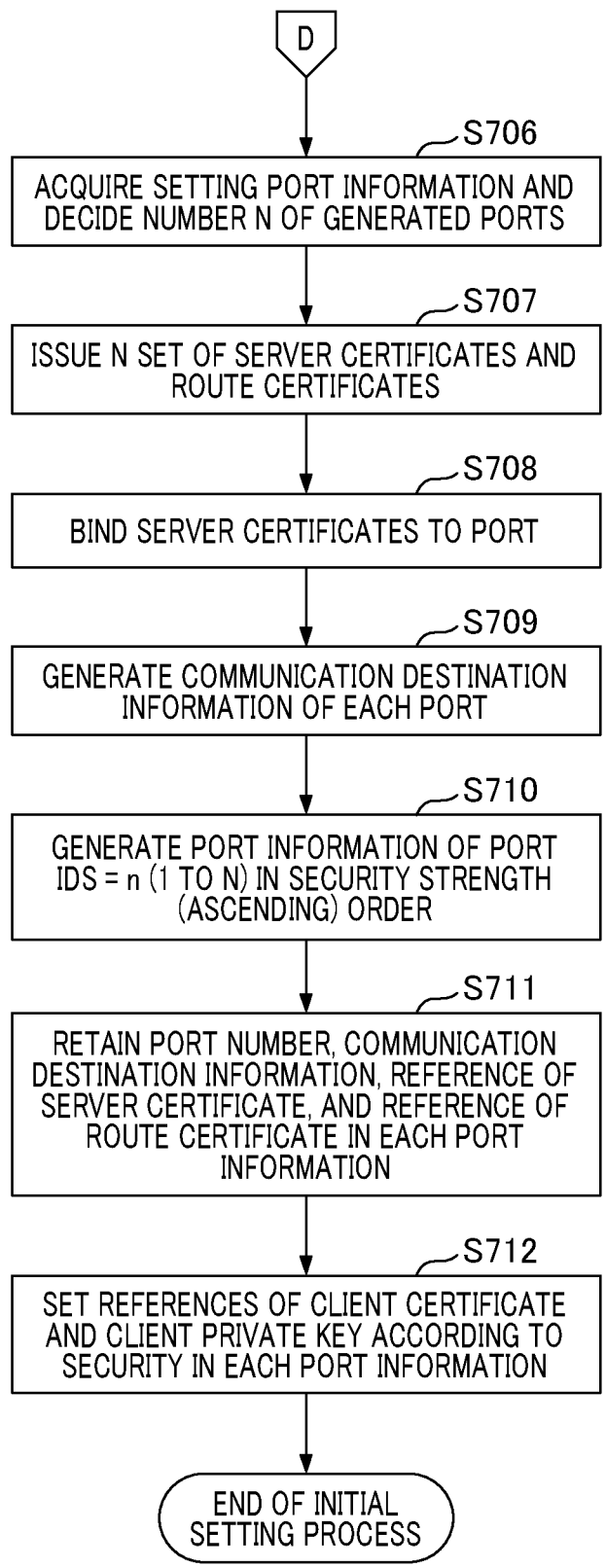
FIG. 9 is an explanatory flowchart illustrating an initial setting process.

FIGS. 8 and 9 are explanatory flowcharts illustrating an initial setting process of S605 in FIG. 6.

In S701 of FIG. 8, the control unit 403 acquires an IP address (both IP addresses usable for IPv4 and IPv6) and a host name of the self-device. Subsequently, in S702, the control unit 403 acquires the maximum number of server certificates. The maximum number of server certificates is the number of kinds of server certificates covering all the monitoring target devices 102x which can be supported by the monitoring device 101. The kinds of server certificates are set in advance in the monitoring device or an external file. The maximum number of server certificates is acquired by counting the kinds of server certificates.

Subsequently, in S703, the control unit 403 decides the maximum number of ports and each default port number. The maximum number of ports in the embodiment is the same as the maximum number of server certificates acquired in S702. The default port number is defined in advance for each kind of server certificate as system setting. Subsequently, in S704, the control unit 403 initializes and displays the initial setting screen of the device management program. The control unit 403 decides the initial value of the items related to the embodiment in S701 to S703 and initializes items related to the initial setting screen for screen display.

FIG. 15 is a diagram illustrating an example of an initial setting screen.

The initial setting screen illustrated in FIG. 15 is an example of a wizard scheme. The description of a setting screen not related to the present invention will be omitted. The control unit 403 manages information regarding a first reception port and information regarding a second reception port in regard to an IP address of the self-device. Through a manipulation on the initial setting screen, port information necessary to generate the reception ports of a monitoring device side according to the present invention is decided. On the initial setting screen illustrated in FIG. 15, an address of the monitoring device is designated by selecting a host name or an IP address. The IP address is selected from either IPv4 or IPv6. When the host name is selected, it is possible to handle a change in the IP address of the monitoring device. However, since name resolution is necessary with a host name input to the monitoring target device side, it is necessary to set a network of the monitoring target device side. When the IP address is selected, name resoluble setting is not necessary on the monitoring target device side. However, when the IP address of the monitoring device is changed, it is necessary to reset a URL decided with a changed address in the monitoring target device 102x.

On the initial setting screen illustrated in FIG. 15, an IPv4 address is selected. Thus, the IP address and the host name acquired in S701 and the default port number acquired in S703 are displayed as initial values. In the embodiment, one network card can be used and a previously allocated IPv4 address is displayed. In addition, when a plurality of network cards can be used and a plurality of IPv4 addresses can be thus used, candidates can be configured to be selectable in a drop-down list. In the embodiment, since the maximum number of server certificates acquired in S702 is 2 and an address to be used is selectable, the number of ports calculated in S703 is 2.

In the embodiment, to facilitate the description, anyone IP address is selectable and the maximum number of server certificates and the number of ports are set to 2. However, in the present invention, it is needless to say that the maximum number of server certificates and the number of ports are not limited. An operator of the initial setting, such as a service technician, selects one address to monitor the monitoring target device 102x and edits an appropriate port number. After the editing is executed or when the editing is not necessary, a next button is pressed directly, and then an initial setting screen of another item is displayed. After a series of initial setting is completed, a button intended to complete the setting on the screen is pressed to complete the initial setting.

Referring back to FIG. 8, the description will be described. In S705, the control unit 403 determines whether it is detected that the initial setting is completed. When the control unit 403 detects that the initial setting is completed, the process proceeds to S706 of FIG. 9. When the control unit 403 does not detects that the initial setting is completed, the process returns to S705 and the completion of the initial setting stands by. Subsequently, in S706 of FIG. 9, the control unit 403 acquires setting port information based on content set on the initial setting screen to decide the number N of generated ports. In the example illustrated in FIG. 15, the IPv4 address and the two port numbers are decided, and the number N of generated ports is 2.

Subsequently, in S707, the control unit 403 requests the authentication station service unit 402 to issues the server certificates. The control unit 403 issues route certificates by which the server certificates can be verified. Setting of an encryption provider, a key size, a digital signature algorithm, and the like related to security levels of the issued server certificates is decided by both the system setting and the initial setting retained in advance. In the embodiment, since the kinds of server certificates are the same as the number of issued server certificates, the setting of the encryption provider, the key size, the digital signature algorithm, and the like related to the security levels of the server certificates is decided by the system setting.

Subsequently, in S708, the control unit 403 requests the communication unit 401 to bind the generated server certificates to the ports designated in the initial setting. In the embodiment, the control unit 403 associates the first server certificate with the first reception port and associates the second server certificate with the second reception port. Subsequently, in S709, the control unit 403 generates communication destination information (URL) by the address and the port numbers designated by the initial setting. The URL is a connection URL of each reception port and is configured as in https://(address):(port number)/(service name). Subsequently, in S710 to S712, the control unit 403 generates port information and executes a setting process.

FIG. 19 is a diagram illustrating an example of port information.

The port information (Data: PortInfo1501) includes a port ID (PortID 1502), apart number (PortNo 1503), and communication destination information (webServiceURL 1504) for accessing this port illustrated in the drawing. The port information includes a reference (ServerCert 1505) of the corresponding server certificate and a reference (RootCACert 1506) of the route certificate. The port information further includes a reference (ClientCert 1507) of the client certificate and a reference (ClientKey 1508) of a client private key. The port information additionally includes a member necessary for an operation of the device management program. However, since the member is irrelevant to the nature of the present invention, the description thereof will be omitted.

Referred back to FIG. 9, the description will be made. In S710, the control unit 403 generates port information in which port IDs are numbered in a security strength order. In the embodiment, the port IDs are numbered in sequence in the ascending security strength order, 1 is the lowest security strength, and a value increasing by 1 in the lower order is numbered. In the example of FIG. 19, when 2 is allocated and two ports are generated, the ports are examples of ports with the high security strength.

Subsequently, in S711, the control unit 403 instructs the device management unit 405 to set the port numbers, the communication destination information, the reference of the server certificates, and the reference of the route certificates in the generated port information and retains the port information in the database 104 via the database access unit 406. PortNo 1503 illustrated in FIG. 19 is a port number and 443 is allocated. webServiceUrl 1504 is an URL used for the monitoring target device 102x to access this port and indicates the communication destination information generated in S709.

In the example illustrated in FIG. 19, communication destination information including an address: "172.10.20.123" and a port number: 443 is set. ServerCert 1505 is a reference of the server certificate bound to the port in S709 of FIG. 9 and the server certificate storage unit 409 refers to data as SCDATA01. RootCACert 1506 is reference of the route certificate for proving validity of the server certificate and the route certificate storage unit 410 refers to data as CADATA01.

Referred back to FIG. 9, the description will be made. In S712, the control unit 403 sets the reference of the client certificate and the reference of the client private key in the port information and retains the reference of the client certificate and the reference of the client private key in the database 104 as in S711. ClientCert 1507 illustrated in FIG. 19 is a reference example of the client certificate corresponding to the security level of the server certificate of the same port and the client certificate storage unit 411 refers to data as CCDATA01.

ClientKey 1508 is a reference example of the client private key and the private key storage unit 412 refers to the reference example as CKEY01. ClientCert 1507 and ClientKey 1508 are used for client authentication in TLS handshake protocol processing used to determine whether to execute communication destination information setting in the SSL/TLS communication in which the port is set in the monitoring target device 102x. After the process of S712, the initial setting process ends.

Figure 10:
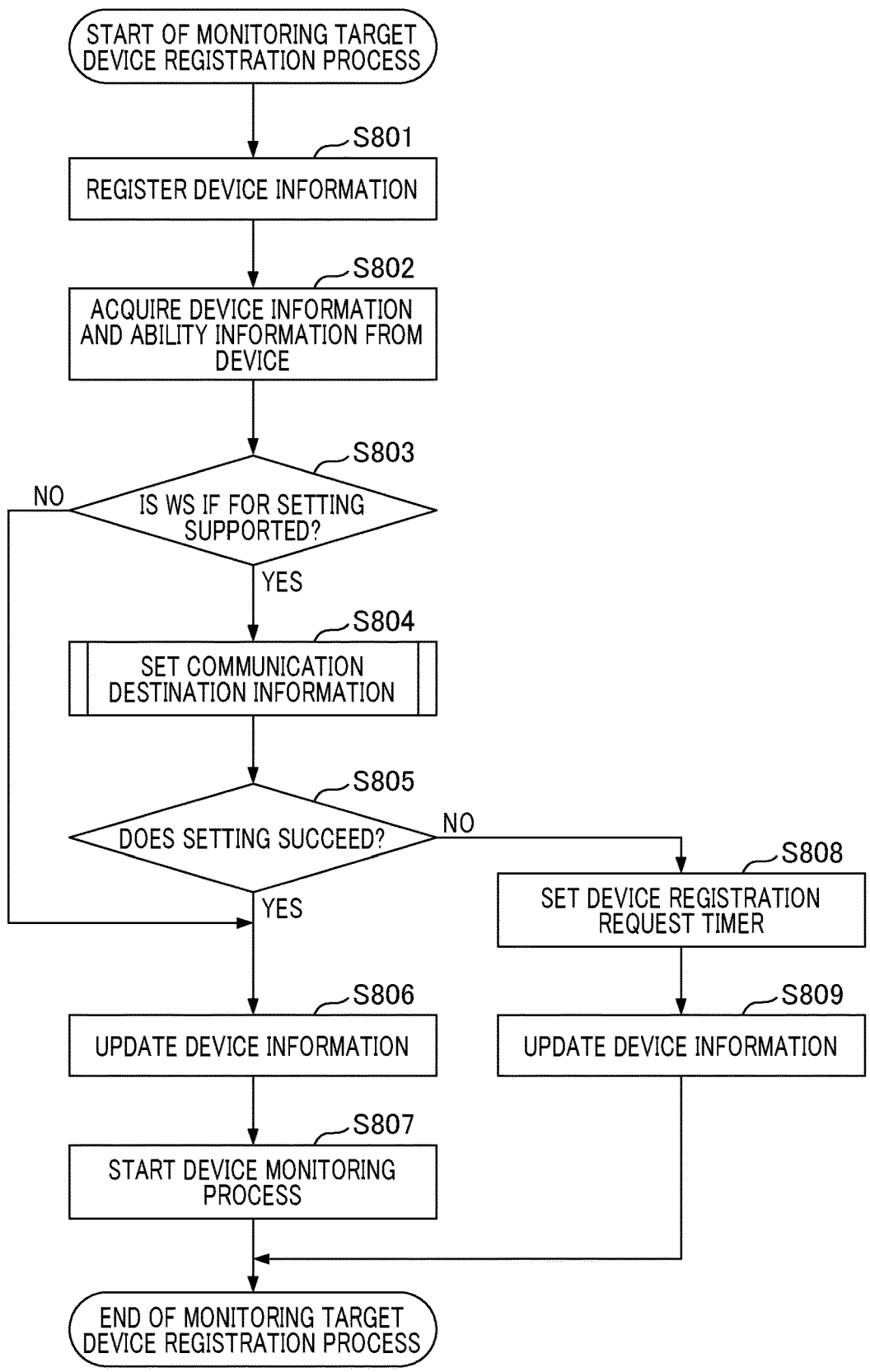
FIG. 10 is an explanatory flowchart illustrating a monitoring target device registration process.

FIG. 10 is an explanatory flowchart illustrating a monitoring target device registration process in S607 of FIG. 6.

In S801, the control unit 403 instructs the device management unit 405 to register device information regarding a registration target device.

FIG. 20 is a diagram illustrating an example of device information.

The device information (Data: DeviceInfo 1601) includes a device ID (DeviceID 1602) with which the device is uniquely identifiable on a system and a serial number (SerialNumber 1603) unique for each maker. The device information includes address information (Ip4 Address 1604/Ip6 Address 1605/HostName 1606) and ability information (DeviceAbility 1607) regarding the device. The device information includes a device registration state (RegistState 1608), a device state (DeviceState 1609), and a use port ID (PortID 1610). The device ID and the address information are instructed as input parameters of a device registration request. Other information is initialized to each initial value and is reset during this registration process.

Referred back to FIG. 10, the description will be made. In S802, the control unit 403 instructs the device information acquisition unit 404 to acquire the ability information and the device information such as the serial number from a registering target device. To acquire the device information and the ability information, for example, a method of acquiring the MIB information mounted on the device using SNMP is generally used. However, a protocol applied to the present invention is not limited. The ability information is encoded to be used by the device information acquisition unit 404.

Subsequently, in S803, the control unit 403 determines whether a web service I/F for the communication destination information setting according to the embodiment is supported by the target device based on the acquired ability information. When the web service I/F for the communication destination information setting is supported by the target device, the process proceeds to S804. When the web service I/F for the communication destination information setting is not supported by the target device, the process proceeds to S806.

In S804, the control unit 403 executes the communication destination information setting process. The details of the communication destination information setting process will be described with reference to FIGS. 11 and 12. Subsequently, in S805, the control unit 403 determines whether the communication destination information setting process succeeds, that is, the communication destination information is normally set in the registration target device according to a result of the communication destination information setting process. When the communication destination information setting process succeeds, the process proceeds to S806. When the communication destination information setting process fails, the process proceeds to S808.

In S806, the control unit 403 updates the device information. The ability information (DeviceAbility 1607) and the serial number (SerialNumber 1603) regarding the device acquired in S802 and encoded are also updated in the process of S806. When the communication destination information setting process executes, the port ID (PortID 1610) is updated during the communication destination information setting process. The device registration state (RegistState 1608) is updated to "REGISTERING" indicating "during registration" when the ability information is not acquirable. When the ability information is acquirable, the device registration state is updated to "REGISTERED" indicating "registration success."

For the device state (DeviceState 1609), the control unit 403 retains the device state acquired from the device. As the initial state, for example, "NOERROR" is set at the time of communication success. At the time of communication failure, "COMERROR" is set. Subsequently, in S807, the control unit 403 starts the device monitoring process and ends the monitoring target device registration process.

In S808, the control unit 403 sets a device registration request timer to execute the device registration process again. According to the setting of the device registration request timer, the process of registering the monitoring target device 102x is executed again in S606 of FIG. 6. Subsequently, in S809, the control unit 403 updates the device information as in S806. Then, the monitoring target device registration process ends.

Figure 11:
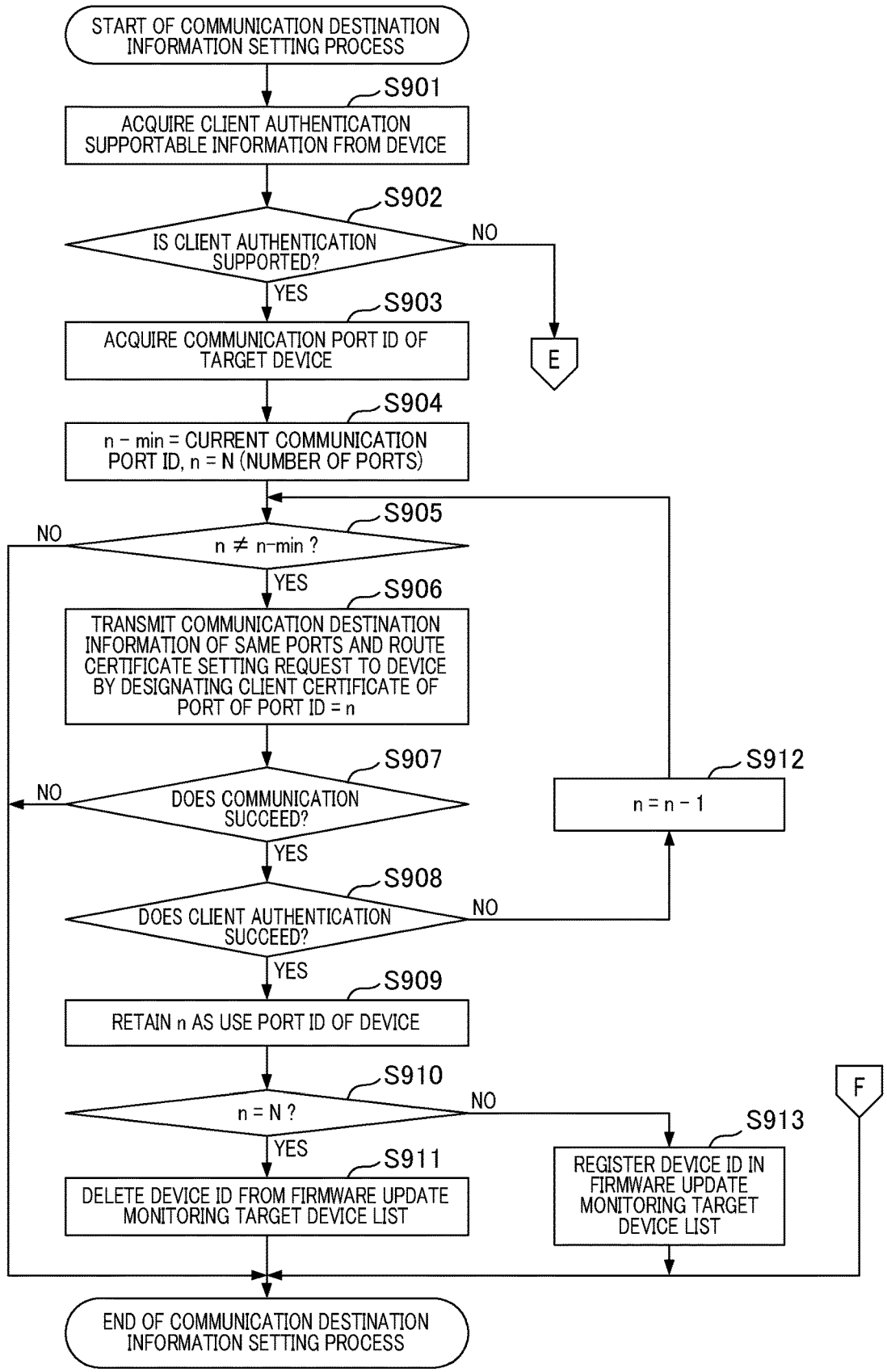
FIG. 11 is an explanatory flowchart illustrating an example of a communication destination information setting process.
Figure 12:
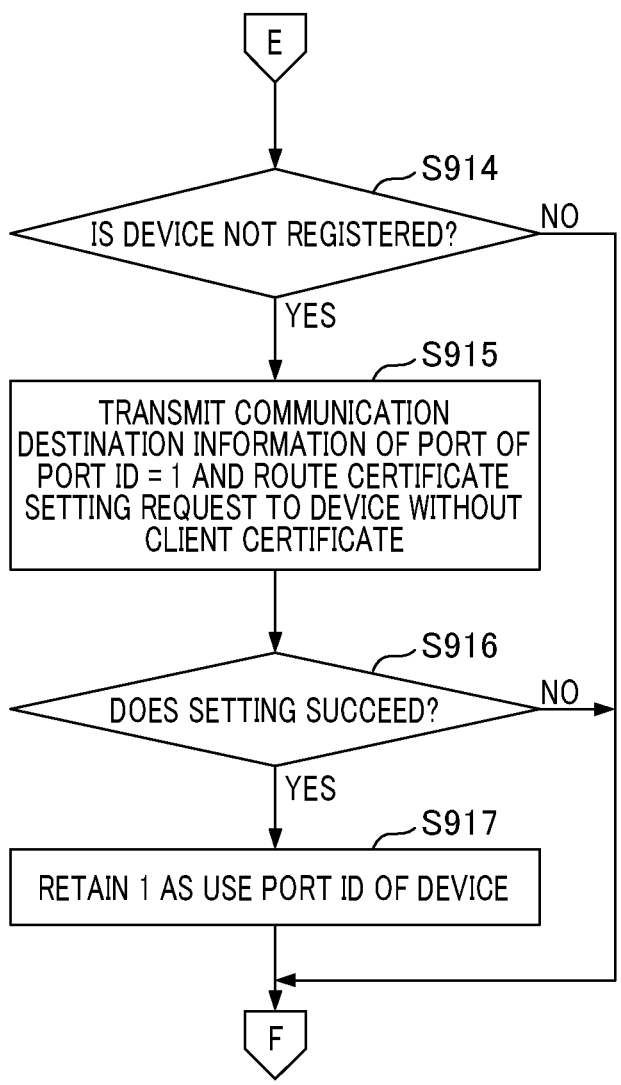
FIG. 12 is an explanatory flowchart illustrating an example of the communication destination information setting process.

FIGS. 11 and 12 are explanatory flowcharts illustrating an example of the communication destination information setting process executed by the monitoring device.

The feature of the embodiment is that the monitoring device 101 causes the monitoring target device 102x to attempt client authentication in the order of the ports with the higher corresponding security strengths. When the authentication fails in a network device as a transmission result of the connection URL, the control unit 403 transmits the port number, and the route certificate corresponding to the first sever certificate, the connection URL, and the port number, the route certificate corresponding to the second server certificate to the network device. The control unit 403 transmits the connection URL, the port number, and the route certificate as information for the client authentication in the TLS handshake protocol process.

In S901 of FIG. 11, the control unit 403 first acquires client authentication supportable information from the monitoring target device 102x. The client authentication supportable information indicates whether the monitoring target device 102x supports the client authentication. A protocol used to acquire the client authentication supportable information is not limited, but may be acquired with the MIB information by SNMP or may be acquired by the web service I/F for information acquisition mounted on a device side.

Subsequently, in S902, the control unit 403 determines whether the monitoring target device 102x supports the client authentication based on the client authentication supportable information. When the monitoring target device 102x supports the client authentication, the process proceeds to S903. When the monitoring target device 102x does not support the client authentication, the process proceeds to S914 of FIG. 12.

Subsequently, in S903, the control unit 403 acquires the port ID of the monitoring target device 102x. Specifically, the control unit 403 acquires the port ID (PortID 1610) from the device information (Data: DeviceInfo 1601) of the monitoring target device 102x managed by the device management unit 405. In the initial state, the port ID of the device information is set to 0.

Subsequently, in S904, the control unit 403 initializes a variable used in this process. The control unit 403 sets the acquired port ID in n−min and sets the number N of all ports in n. The number N of all ports is the same as the number of ports generated in S706 of FIG. 9. Subsequently, in S905, the control unit 403 determines whether n is equal to n−min, that is, the communication destination information setting process is executed. When the control unit 403 determines that n is not equal to n−min and the communication destination information setting process is executed, the process proceeds to S906. When the control unit 403 determines that n is equal to n−min and the communication destination information setting process is executed, the process ends.

Subsequently, in S906, the control unit 403 acquires the port information (Data: PortInfo 1501) in which the port ID is n via the device management unit 405 to set the communication destination information in the monitoring target device 102x. The control unit 403 uses the communication destination information in the port information, the reference (RootCACert 1506) of the route certificate, the reference (ClientCert 1507) of the client certificate, and the client private key (ClientKey 1508). Specifically, the control unit 403 instructs the communication unit 401 to transmit a request for setting the route certificate and the communication destination information to the monitoring target device 102x, involving the client authentication in which the client certificate and the client private key are used.

FIG. 18 is a diagram illustrating an example of communication data for making a request for setting a route certificate and communication destination information transmitted to the monitoring target device by the monitoring device.

Communication data (method: setCommSettings 1401) illustrated in FIG. 18 schematically indicate a data structure. Actually, the communication data is encoded to data with an XML format by the communication unit 401, is encrypted through the SSL/TLS communication, and is transmitted to the monitoring target device 102x. The setting method setCommSettings 1401 of the route certificate and the communication destination information includes a device serial number (SerialNumber) 1402 and communication destination information (webServiceUrl) 1403 as input data. Further, setCommSettings 1401 includes a process type (ProcessType) 1404 and a route certificate (CertInfo) 1405. A serial number of a designated device is a serial number (SerialNumber 1603) in the device information (DeviceInfo 1601) of the monitoring target device 102x. The designated communication destination information becomes communication destination information (webServiceUrl 1504) in the port information (PortInfo 1501) referred to with the port ID (PortID 1610) in the device information. The designated route certificate becomes the route certificate (RootCACert 1506) in the port information (PortInfo 1501) and is data acquired via the device management unit 405 by the control unit 403. The control unit 403 sets the process type (ProcessType 1404) according to process content.

When the communication data illustrated in FIG. 18 is received, the monitoring target device 102x determines whether the designated serial number: SerialNumber 1402 is the serial number of the self-device or the process type: ProcessType is a processible type. Further, the monitoring target device 102x determines whether the data format of the communication destination information: websServiceUrl is rightful. When there is no problem, a process of setting the communication destination information and the route certificate is executed.

Referred back to FIG. 11, the description will be made. In S907, the control unit 403 determines whether the communication of the setting process of S906 succeeds. When the communication succeeds, the process proceeds to S908. When the communication does not succeed, device power interruption, network abnormality, or the like is considered. Therefore, the setting process ends. Subsequently, in S908, the control unit 403 determines whether the client authentication succeeds. An example of a communication sequence between the monitoring device 101 and the monitoring target device 102x in the SSL/TLS communication of S906 to S908 will be described with reference to FIGS. 13 and 14.

When it is determined that the client authentication succeeds, it can be determined that there is no problem in the set reception port. Accordingly, in S909, the control unit 403 sets the port ID (DeviceInfo.PortID) of the monitoring target device 102x to n. When it is determined that the client authentication fails, no communicable is executable in the set reception port. Accordingly, in S912, the control unit 403 decreases n to attempt the port with lower security strength. After the process of S912, the process returns to S905.

In S910, the control unit 403 determines whether n is equal to N, that is, the security strength of the port set in the monitoring target device 102x is the highest. When it is determined in S910 that n is equal to N, the process proceeds to S911. When it is determined that n is not equal to N, that is, the security strength is not the highest, the process proceeds to S913.

In S911, the control unit 403 deletes the device ID of the monitoring target device 102x from the firmware update monitoring target device list. When the device ID is not loaded to the firmware update monitoring target device list, the device ID of the monitoring target device 102x is not deleted. In S913, the control unit 403 registers the device ID of the monitoring target device 102x in the firmware update monitoring target device list. When the registration of the device ID is finished, double registration is not executed. After the processes of S911 and S913, the communication destination information setting process ends.

In S914 of FIG. 12, the control unit 403 determines whether the device is not registered. When it is determined that the device has been registered, the process of S915 has already ended. Therefore, the communication destination information setting process ends. When it is determined that the device is not registered, the process proceeds to S915. Subsequently, in S915, the control unit 403 transmits a communication destination information setting request to the monitoring target device 102x using the communication destination information and the route certificate of the port in which the security strength is the lowest, that is, the port ID is 1, as in S906. The client certificate and the client private key necessary for the client authentication are not necessary. In the embodiment, in S914, it is assumed that there is the monitoring target device 102x that does not execute the client authentication and the monitoring target device 102x can communicate with only the port in which the security strength is the lowest. It is needless to say that the present invention is not limited to the aspect described in the embodiment. By mounting an exception process covering the ability of a support target device, the system can have flexibility.

Subsequently, in S916, the control unit 403 determines whether the setting of the communication destination information in the transmission process of S915 succeeds. When it is determined that the setting of the communication destination information fails, the communication destination information setting process ends. When it is determined that the setting of the communication destination information succeeds, the process proceeds to S917. In S917, the control unit 403 sets the port ID (DeviceInfoPortID) of a target device to 1. Then, the communication destination information setting process ends.

FIGS. 13 and 14 are diagrams illustrating asequence for describing an example of communication destination information setting process through SSL/TLS communication between the monitoring device and the monitoring target device.

A case in which the communication destination information setting process is executed on the monitoring target device 102x with which the device side can communicate with a port with the second highest security strength will be described as a specific embodiment. S1001 of FIG. 13 corresponds to a request for setting the route certificate and the communication destination information in S906 of FIG.

11. In the embodiment, it is assumed that the number of all ports is 2 and an attempt is made from the setting of the port of which the port ID of the strong security strength is 2. In S1001, the control unit 403 of the monitoring device 101 designates the communication destination information of the port of which the port ID is 2, the route certificate, the client certificate, and the client private key and instructs the communication unit 401 to transmit the request for setting the route certificate and the communication destination information to the monitoring target device. The communication unit 401 of the monitoring device 101 starts the SSL/TLS communication with the communication unit 501 of the monitoring target device 102x. A series of processes according to the present invention in the TLS handshake protocol processing will be described with reference to S1002 to S1008 and S1012 to S1023. Since the other processes are different from the nature of the present invention because of a difference in an operation of a version of the SSL/TLS communication, the description thereof will be omitted.

First, in S1002, the communication unit 401 transmits an SSL version number, an encryption suite, and communication protocol information supported by the communication unit 401 to the communication unit 501 of the monitoring target device 102x. Subsequently, in S1003, the communication unit 501 transmits communicate protocol information such as the SSL version number and the encryption suite used for the communication to the communication unit 401. Then, in S1004, the communication unit 501 transmits the server certificate of the communication unit 501.

Subsequently, in S1005, the communication unit 501 transmits a request for presenting the client certificate to the communication unit 401. Subsequently, in S1006, the communication unit 401 receives the request in S1004 and transmits the client certificate designated in S1001 by the control unit 403 to the communication unit 501. Then, in S1007, the communication unit 401 generates an encrypted premaster private (random number) using a server public key of the server certificate received in S1004 and transmits the encrypted premaster private to the communication unit 501. Further, in S1008, the communication unit 401 generates data with signature using the client private key designated in S1001 by the control unit 403 to indicate that the client certificate transmitted in S1006 is the client certificate of the communication unit 401 and transmits the data with signature to the communication unit 501.

In S1009, the communication unit 501 of the monitoring target device 102x verifies the transmitted client certificate, the premaster private, and the data with signature. The communication unit 501 verifies the client certificate using the route certificate stored in advance with reference to the route certificate storage unit 508. Here, when there is no verifiable route certificate, this process fails. In the embodiment, since the monitoring target device 102x retains only the route certificate used in the port of which the security level is the second highest, the verification fails. Accordingly, in S1010, the communication unit 105 transmits a client certificate error to the communication unit 401.

The communication unit 401 of the monitoring device receives the client certificate error and returns the client certificate error to the control unit 403 as a result of the process of S1001. When the control unit 403 verifies in S908 of FIG. 11 whether the client authentication succeeds, the client authentication error is received and the process proceeds to S912. Then, the control unit 403 decreases the port ID and attempts a subsequent port in S906 of FIG. 11. The request for setting the route certificate and the communication destination information in S906 corresponds to S1011. In S1011, the control unit 403 designates the communication destination information of the port of which the port ID is 1, the route certificate, the client certificate, and the client private key and instructs the communication unit 401 to transmit the request for setting the route certificate and the communication destination information to the monitoring target device 102x. In response to the setting request, the communication unit 401 of the monitoring device and the communication unit 501 of the monitoring target device 102x execute the same processes as S1002 to S1009 in S1012 to S1019.

In S1012, the communication unit 401 transmits communication protocol information of the communication unit 401 to the communication unit 501 of the monitoring target device 102x. In S1013, the communication unit 501 transmits communicate protocol information used for the communication to the communication unit 401. Then, in S1014, the communication unit 501 transmits the server certificate of the communication unit 501. Further, in S1015, the communication unit 501 transmits a request for presenting the client certificate to the communication unit 401. In S1016, the communication unit 401 transmits the client certificate designated in S1011 by the control unit 403 to the communication unit 501.

Subsequently, in S1017, the communication unit 401 generates and transmits an encrypted premaster private (random number) to the communication unit 501. Further, in S1018, the communication unit 401 generates data with signature using the client private key designated in S1011 by the control unit 403 and transmits the data with signature to the communication unit 501.

In S1019, the communication unit 501 of the monitoring target device 102x verifies the transmitted client certificate, the premaster private, and the data with signature. To verify the client certificate, the communication unit 501 verifies the client certificate using the route certificate stored in advance with reference to the route certificate storage unit 508. In the embodiment, the monitoring target device 102x retains the route certificate used with the port of which the security level is the second highest. Accordingly, the verification succeeds and the process continues. Subsequently, in S1020, the communication unit 401 of the monitoring device 101 transmits a notification message for exchanging a cipher. Then, in S1021, the communication unit 401 transmits information indicating that the handshake protocol ends to the communication unit 501. In S1022, the communication unit 501 transmits a message indicating the exchange of the cipher. Then, in S1023, the communication unit 501 transmits information indicating that the handshake protocol ends to the communication unit 401. Thereafter, the handshake protocol proceeds to an application data protocol and the communication between the communication units 401 and 501 is encrypted to execute secure encryption communication.

In S1024, The request for setting the route certificate and the communication designation information of port 1 designated in S1011 are encrypted to be transmitted from the communication unit 401 to the communication unit 501. Then, the communication unit 501 decodes the transmitted setting request at the time of receiving data and delivers the setting request to the control unit 503. Subsequently, in S1025, the control unit 503 receives the request for setting the route certificate and the communication destination information and executes a process of updating the communication destination URL. Thereafter, in S1026, the control unit 503 executes a route certification registration process.

Then, in S1027, the control unit 503 transmits a process result to the communication unit 401 of the monitoring device via the communication unit 501. The communication unit 401 receives the process result and returns the process result to the control unit 403 as the process result of S1011.

Embodiment 2

In Embodiment 1, the reception ports with all the security levels are prepared in advance so that the security levels of all the monitoring target devices 102x which are support targets are covered by the monitoring device 101. Depending on customers, a requested security level is high and communication with a low level is not allowed in some cases. Alternatively, the security level requested in an intranet is not high, but a request to desiring to narrow down the ports to 433 well-known ports or a single port designated by a customer is not low. To meet this request, in Embodiment 2, the monitoring device 101 restricts the reception ports settable through the initial setting screen according to designation of the security strength of communication between the monitoring device 101 and the monitoring target device 102x.

FIG. 16 is a diagram illustrating an initial setting screen according to Embodiment 2.

The control unit 403 of the monitoring device 101 displays a screen so that a plurality of setting items regarding SSL/TLS connection setting between the monitoring device 101 and the monitoring target device 102x can be selected.

In the example illustrated in FIG. 16, the following 3 kinds of setting items are displayed on the screen:

(1) to execute the SSL/TLS communication according to security strength of a device;

(2) to execute SSL/TLS connection of a device that satisfies the following conditions; and (3) to restrict the number of reception ports to 1 and prioritize the number of connected devices.

When (1) is designated, the monitoring device 101 prepares reception ports with all the security levels so that all the security levels of the monitoring target devices 102x which are support targets can be covered.

When (2) is designated, the monitoring device 101 prepares only the reception ports that satisfy numerical values (security levels) indicating the designated security strength. For example, when the number of security levels is 3 and "security level 3 or higher" is selected as in FIG. 16, the monitoring device 101 prepares only the port with security level 3 (highest). As other options, for example, there are "security level 1 or higher" and "security level 2 or higher." When "security level 1 or higher" is selected, the monitoring device prepares the ports with all the security levels. When "security level 2 or higher" is selected, the monitoring device 101 prepares the port with security level 2 (intermediate level) or higher. Each security level may be configured to handle the plurality of ports (the kinds of server certificates). When (3) is designated, the monitoring device 101 prepares one port of which the security level which all the monitoring target devices 102x can handle is the lowest. Thus, the use ports can be narrowed down to one port.

Figure 17:
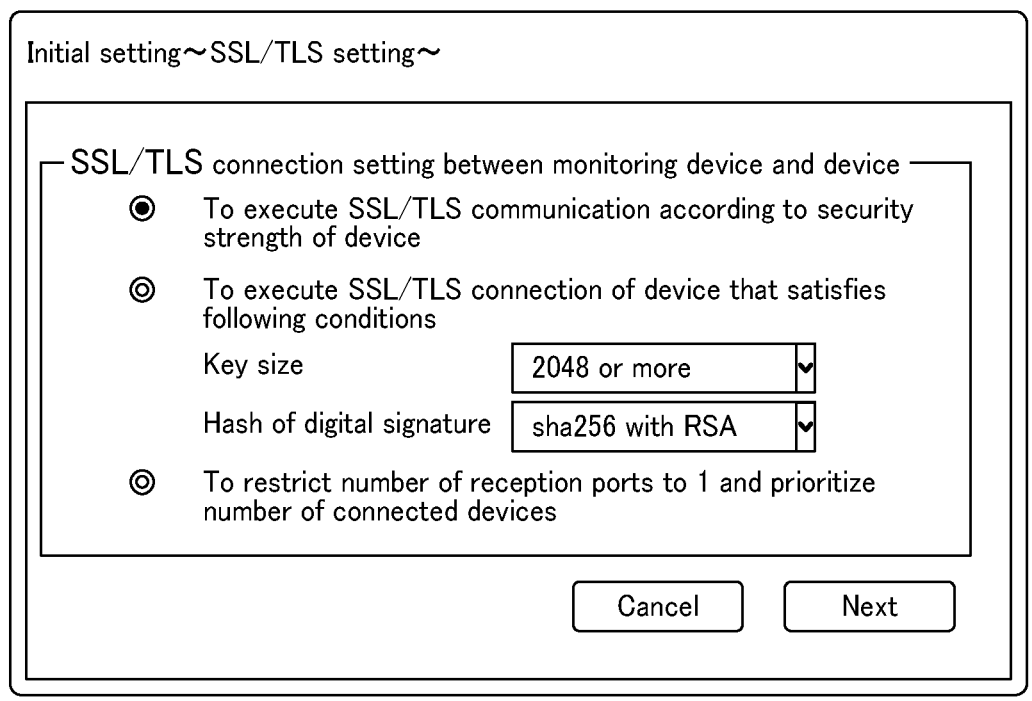
FIG. 17 is a diagram illustrating another example of the initial setting screen.

FIG. 17 is a diagram illustrating another example of the initial setting screen.

The initial setting screen illustrated in FIG. 17 is different from the initial setting screen illustrated in FIG. 16 in only (2). On the initial setting screen illustrated in FIG. 17, options are not designated with the security levels, but a key size and a hash function of digital signature are configured to be specifically designated. In the case of this scheme, setting content of the server certificate is specifically designated and the monitoring device 101 prepares the ports corresponding to the number of corresponding server certificates. When the setting screen illustrated in FIG. 17 is displayed and a "next" button is pressed to display the screen of FIG. 15, the monitoring device 101 can designate a port number of the number of corresponding ports. As described above, the monitoring device 101 according to Embodiment 2 can provide a communication environment according to the security level that satisfies requests of the customers by providing a unit that restricting the ports.

Embodiment 3

In Embodiment 1, the monitoring device 101 displays the initial setting screen configured such that one address of the reception port can be selected as illustrated in FIG. 15. However, in an environment in which a plurality of network cards are used, the devices are desired to monitor in a plurality of sub-networks in some cases. To satisfy this desire, in Embodiment 3, the monitoring device 101 displays an initial setting screen configured such that a plurality of addresses can be designated. The monitoring device 101 can designate each port prepared for each address on the initial setting screen. Here, since the monitoring target device 102x belongs to a sub-network of one address, only one address becomes a target among the plurality of addresses. Accordingly, only a port with an IP reachable address may be attempted from the monitoring target device 102x. To meet this, the monitoring device 101 manages the port for each IP address and security and allocates the sequential port IDs to handle the port IDs in the process described with reference to FIGS. 9, 11, and 12. Specifically, by executing an OR operation on a number by which addresses are identified with high-order bits/bytes of the port ID, it is possible to specify the port ID to be processed. For example, high-order 2 bytes are set as an address identifier and low-order 2 bytes are set with a port ID as the same port ID as that of Embodiment 1.

A case in which two IPv4 addresses: 180.1.10.110 and 180.2.10.100 are used in a reception port will be described as a more specific example. In this case, as address identifiers, 01 is numbered for 180.1.10.110 and 02 is numbered for 180.2.10.100. The monitoring target device 102x to which IP is reachable from the IPv4 address of the address identifier 01 may attempt for only the ports with the same address identifier. When the number of all ports generated to monitor the monitoring target device 102x of the sub-network with the address identifier 01 is 3, the communication destination setting process of the same monitoring target device 102x may be attempted in the order of 0101, 0102, and 0103 of the port IDs. In this way, in the monitoring device 101 according to Embodiment 3, a network with a broader range can be monitored by one monitoring device by handling the plurality of sub-networks. Thus, it is possible to reduce initial installation cost.

Embodiment 4

While a communication environment that satisfies security prerequisites of customers can be provided, a security level at which each monitoring target device communicates with a monitoring device can be desired to be known in some cases. For example, in the case in which the security level of the monitoring target device 102x is improved by updating the firmware, as described in Embodiment 1, a customer or a service technician desires to verify that the security level is really improved. To meet this desire, in Embodiment 4, the monitoring device 101 is configured such that a device management program provides a screen on which detailed information is displayed for each device and security information of a port used as the reception port by the device is displayed as one item of the detailed information. The monitoring device 101 displays, for example, information such as the security level, the key size, and the hash algorithm for digital signature applied in Embodiment 3 as the security information. As described above, the monitoring device 101 according to Embodiment 4 can further meet the user request by providing a unit to confirm a security level of a use port of the monitoring target device 102x.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017 -006177, filed Jan. 17 2017, which is hereby incorporated by reference wherein in its entirety.

What is claimed is:

1. A monitoring device that monitors a network device, the monitoring device comprising,
a memory storing instructions;
at least one processor which is capable of executing the instructions causing the monitoring device to:
manage information regarding a first reception port and information regarding a second reception port in regard to an IP address of a self-device;
issue a route certificate corresponding to a first server certificate and a route certificate corresponding to a second server certificate for realizing communication of relatively lower security strength than the first server certificate;
associate the first server certificate with the first reception port;
associate the second server certificate with the second reception port;
decide and retain, as data for each reception port, a connection URL and a port number of each reception port;
transmit the route certificate corresponding to the first server certificate and data for the first reception port to the network device, and
when authentication in the network device fails as a result of the transmission of the route certificate corresponding to the first server certificate and the data for the first reception port, transmit the route certificate corresponding to the second server certificate and data for the second reception port to the network device.

2. The monitoring device according to claim 1, wherein the transmission of the route certificate corresponding to the first server certificate and the data for the first reception port is performed for client authentication in TLS handshake protocol processing.

3. The monitoring device according to claim 1, wherein the instructions further cause the monitoring device to display a screen used to set each reception port by designating the IP address or a host name, and decide the connection URL using the port number of each of the set reception ports.

4. The monitoring device according to claim 3, wherein the reception ports settable through the screen are restricted in accordance with designation of security strength of communication between the monitoring device and the network device.

5. The monitoring device according to claim 4, wherein the reception ports settable through the screen are restricted in accordance with designation of a hash function of a key size and digital signature.

6. The monitoring device according to claim 1, wherein, when it is detected that firmware of the network device is updated, the transmission of the route certificate corresponding to the first server certificate and the data for the first reception port is performed.

7. A method for a monitoring device that monitors a network device, the method comprising,
managing information regarding a first reception port and information regarding a second reception port in regard to an IP address of a self-device;
issuing a route certificate corresponding to a first server certificate and a route certificate corresponding to a second server certificate for realizing communication of relatively lower security strength than the first server certificate;
associating the first server certificate with the first reception port;
associating the second server certificate with the second reception port;
deciding and retain, as data for each reception port, a connection URL and a port number of each reception port;
transmitting the route certificate corresponding to the first server certificate and data for the first reception port to the network device, and
when authentication in the network device fails as a result of the transmission of the route certificate corresponding to the first server certificate and the data for the first reception port, transmitting the route certificate corresponding to the second server certificate and data for the second reception port to the network device.

8. A non-transitory computer readable storage medium on which is stored a computer program for making a computer execute a method for a monitoring device that monitors a network device, the method comprising:

managing information regarding a first reception port and information regarding a second reception port in regard to an IP address of a self-device;

issuing a route certificate corresponding to a first server certificate and a route certificate corresponding to a second server certificate for realizing communication of relatively lower security strength than the first server certificate;

associating the first server certificate with the first reception port;

associating the second server certificate with the second reception port;

deciding and retain, as data for each reception port, a connection URL and a port number of each reception port;

transmitting the route certificate corresponding to the first server certificate and data for the first reception port to the network device, and when authentication in the network device fails as a result of the transmission of the route certificate corresponding to the first server certificate and the data for the first reception port, transmitting the route certificate corresponding to the second server certificate and data for the second reception port to the network device.

* * * * *